United States Patent
Archer

(10) Patent No.: US 9,047,516 B2
(45) Date of Patent: Jun. 2, 2015

(54) CONTENT FINGERPRINTING

(75) Inventor: Donald Gene Archer, Euless, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 931 days.

(21) Appl. No.: 12/818,516

(22) Filed: Jun. 18, 2010

(65) Prior Publication Data

US 2011/0311095 A1 Dec. 22, 2011

(51) Int. Cl.
*G06K 9/00* (2006.01)
*G11B 27/28* (2006.01)
*H04N 21/4223* (2011.01)
*H04N 21/8358* (2011.01)
*G06F 17/30* (2006.01)

(52) U.S. Cl.
CPC ............ *G06K 9/00744* (2013.01); *G11B 27/28* (2013.01); *H04N 21/4223* (2013.01); *H04N 21/8358* (2013.01); *G06F 17/30784* (2013.01)

(58) Field of Classification Search
None
See application file for complete search history.

(56) References Cited

U.S. PATENT DOCUMENTS

| | | | |
|---|---|---|---|
| 7,003,500 B1 * | 2/2006 | Driessen | 705/74 |
| 7,095,871 B2 * | 8/2006 | Jones et al. | 382/100 |
| 7,302,057 B2 * | 11/2007 | Rotholtz et al. | 380/200 |
| 8,094,872 B1 * | 1/2012 | Yagnik et al. | 382/100 |
| 8,201,105 B2 * | 6/2012 | Tabe | 715/838 |
| 8,295,363 B2 * | 10/2012 | Seet et al. | 375/240.26 |
| 8,332,478 B2 * | 12/2012 | Levy et al. | 709/217 |
| 2002/0033844 A1 * | 3/2002 | Levy et al. | 345/744 |
| 2002/0034319 A1 * | 3/2002 | Tumey et al. | 382/116 |
| 2004/0153647 A1 * | 8/2004 | Rotholtz et al. | 713/176 |
| 2004/0153648 A1 * | 8/2004 | Rotholtz et al. | 713/176 |
| 2006/0050932 A1 * | 3/2006 | Tumey et al. | 382/116 |
| 2006/0062073 A1 * | 3/2006 | Kitani et al. | 365/232 |
| 2006/0284976 A1 * | 12/2006 | Girgensohn et al. | 348/135 |
| 2008/0049971 A1 * | 2/2008 | Ramos et al. | 382/100 |
| 2008/0146277 A1 * | 6/2008 | Anglin et al. | 455/556.1 |
| 2009/0077049 A1 * | 3/2009 | Seet et al. | 707/4 |
| 2010/0114951 A1 * | 5/2010 | Bauman et al. | 707/770 |
| 2010/0169358 A1 * | 7/2010 | Zhang | 707/769 |
| 2010/0215210 A1 * | 8/2010 | Zhang | 382/100 |
| 2010/0226523 A1 * | 9/2010 | Srinivasan et al. | 382/100 |
| 2011/0019870 A1 * | 1/2011 | Ballocca et al. | 382/100 |
| 2011/0080958 A1 * | 4/2011 | Srpljan et al. | 375/240.25 |
| 2011/0311095 A1 * | 12/2011 | Archer | 382/100 |
| 2013/0086466 A1 * | 4/2013 | Levy et al. | 715/234 |

FOREIGN PATENT DOCUMENTS

CN  WO 2009/140817  * 11/2009 ............. G06F 17/30

* cited by examiner

*Primary Examiner* — Stephen R Koziol
*Assistant Examiner* — Mia M Thomas

(57) ABSTRACT

A device may include a video camera for capturing a video clip, a processor, a transmitter, and a receiver. The processor may be configured to receive, from the video camera, the video clip that is shown on a display screen of a content presentation device. The transmitter may be configured to send the video clip or a fingerprint of the video clip to a remote device. The receiver may be configured to receive, from the remote device, an identity of content whose fingerprints match the fingerprint.

11 Claims, 9 Drawing Sheets

CONTENT FINGERPRINTING

BACKGROUND

There are many ways in which people may "sample" goods before they buy them. In stores, a purchaser may examine or view products that are exhibited on shelves. On the Internet, the purchaser may play a song accessing an online music store.

DETAILED DESCRIPTION

The following detailed description refers to the accompanying drawings. The same reference numbers in different drawings may identify the same or similar elements. As used herein, the term "playing content" may include decoding encoded content, and outputting the decoded content to a presentation device (e.g., television, computer, smart phone, etc.). The encoded content may be obtained from a local media (e.g., hard disk drive) or received from a remote device over a network.

As described below, a mobile device may be used to identify a video/audio. For example, a user may direct a smart phone's camera/microphone to a video/audio that is playing on a television and capture a clip (e.g., few frames) of the video/audio. Based on the clip, the mobile device may generate and transmit a fingerprint to a remote, network device. The network device may identify the original video/audio based on the fingerprint, and notify the user. The user may view, purchase or bookmark the original video/audio.

Figure 1:
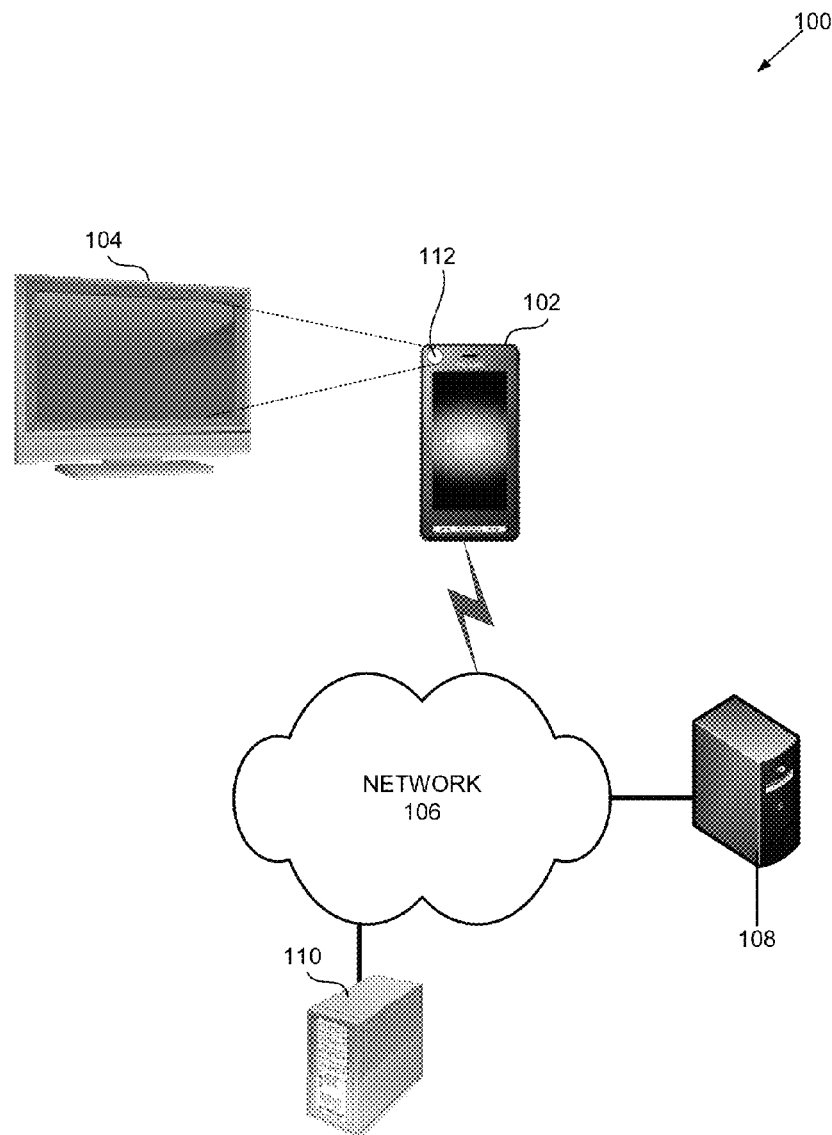
FIG. 1 illustrates an exemplary network in which concepts described herein may be implemented.

FIG. 1 illustrates an exemplary network 100 in which concepts described herein may be implemented. As shown, network 100 may include a mobile device 102, content presentation device 104, network 106, content identifier device 108, and content storage device 110. For simplicity, FIG. 1 does not show other network elements that may be present in network 100 (e.g., routers, switches, bridges, etc.).

Mobile device 102 may include any of the following devices: a tablet computer; a mobile telephone; a cellular phone; a personal communications system (PCS) terminal that may combine a cellular radiotelephone with data processing, facsimile, and/or data communications capabilities; a laptop; a personal digital assistant (PDA) that can include a telephone; a gaming device or console; a peripheral (e.g., wireless headphone); a digital camera; a digital video camera; or another type of computational or communication device with a camera/microphone.

Mobile device 102 may capture a clip of a video/audio that is playing on another device via, for example, a video camera 112 or a microphone (not shown) that is installed on mobile device 102. Upon capturing the video/audio clip, mobile device 102 may fingerprint the clip and send the fingerprint to content identifier device 108. The user of mobile device 102 may receive notifications from content identifier device 108 and/or content storage device 110 about the original content (e.g., movie, television program, piece of music, etc.) with a matching video/audio fingerprint.

Mobile device 102 may also provide communication services to a user (e.g., text messaging, email, place/receive a telephone call, browse a web page, etc.) and/or other application specific services (e.g., manage a photo-album, play music, play a game, etc.).

Content presentation device 104 may include a television (e.g., cable television), a digital video disc (DVD) player, compact disc (CD) player, a computer with a display (e.g., a laptop, personal computer, etc.), video tape player, electronic bill board, and/or any type of device that is capable of playing video/audio content. In some implementations, content presentation device 104 may also include passive component, such as a projection screen.

Network 106 may include one or more wired and/or wireless networks that are capable of exchanging information, such as voice, video, documents, multimedia, text, etc. For example, network 106 may include one or more public switched telephone networks (PSTNs) or another type of switched network. Network 106 may also include a number of transmission towers for receiving wireless signals and forwarding the signals toward the intended destination. Network 106 may further include one or more packet switched networks, such as an Internet protocol (IP) based network, a local area network (LAN), a wide area network (WAN), a personal area network (PAN), an intranet, the Internet, or another type of network that is capable of exchanging information. In FIG. 1, devices 102, 104, 108, and 110 may communicate with any other device directly via network 106.

Content identifier device 108 may receive a video/audio fingerprint from a remote device (e.g., mobile device 102) and identify the original content with a matching fingerprint (e.g., lookup the fingerprint in a database). Upon obtaining the identification, content identifier device 108 may notify the user of mobile device 102 at a network address associated with the user (e.g., send an email identifying the original content (e.g., a Universal Resource Locator/Identifier (URL/URI)) to an email address of the user. In some implementations, content identifier device 108 may cause the original content to be sent from content storage device 110 to the user's computer or a cable television (TV) with an Internet Protocol (IP) address or device address.

Content storage device 110 may include a database of content (e.g., movies, music, advertisements, etc.) and their schedules. Content storage device 110 may provide the schedules and/or content to content identifier device 108 and/or to another device (e.g., content presentation device 104).

Depending on the implementation, network 100 may include additional, fewer, different, or different arrangement of devices than those illustrated in FIG. 1. For example, in one implementation, network 100 may include additional mobile devices, server devices, gateways, etc. In a different implementation, content identifier device 108 and content storage device 110 may be integrated into a single device. In yet another implementation, content storage device 110 may be implemented as multiple devices.

Figures 2A, 2B:
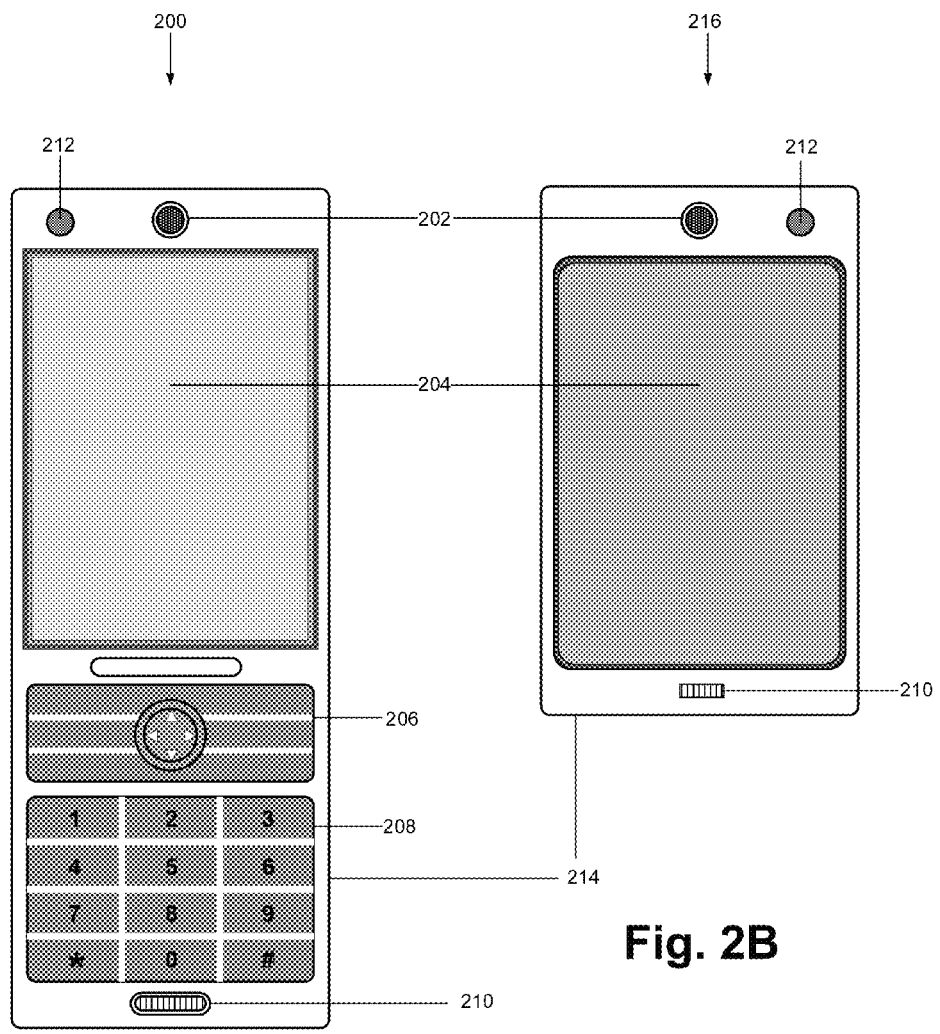
FIGS. 2A and 2B illustrate the exemplary mobile device of FIG. 1 according to different implementations.

FIG. 2A is a diagram of mobile device 102 according one exemplary implementation 200. In this implementation, mobile device 200 is in the form of a portable phone (e.g., a cell phone). As shown in FIG. 2A, portable phone 200 may include a speaker 202, display 204, control buttons 206, keypad 208, microphone 210, camera 212, and housing 214.

Speaker 202 may provide audible information to a user of portable phone 200. Display 204 may provide visual information to the user, such as an image of a caller, video images, or pictures.

Control buttons 206 may permit the user to interact with device 200 to cause device 200 to perform one or more operations, such as place or receive a telephone call. Keypad 208 may include a standard telephone keypad. Microphone 210 may receive audible information from the user. Camera 212 may enable a user to view, capture, store, and process images of a subject in/at front of portable phone 200.

Housing 214 may provide a casing for components of portable phone 200 and may protect the components from outside elements. Although not illustrated in FIG. 2A, portable phone 200 may include additional, fewer, or different components, such as a flash, a camera (located on the back of portable phone 200) via which portable phone 200 may capture video clips, etc.

FIG. 2B is a diagram of device 102 according to another exemplary implementation 216 (e.g., a smart phone). In contrast to device 200, device 216 may provide display 204 that includes a touch screen and a graphical user interface that replaces control keys 206 and keypad 208 in portable phone 200.

Figure 3:
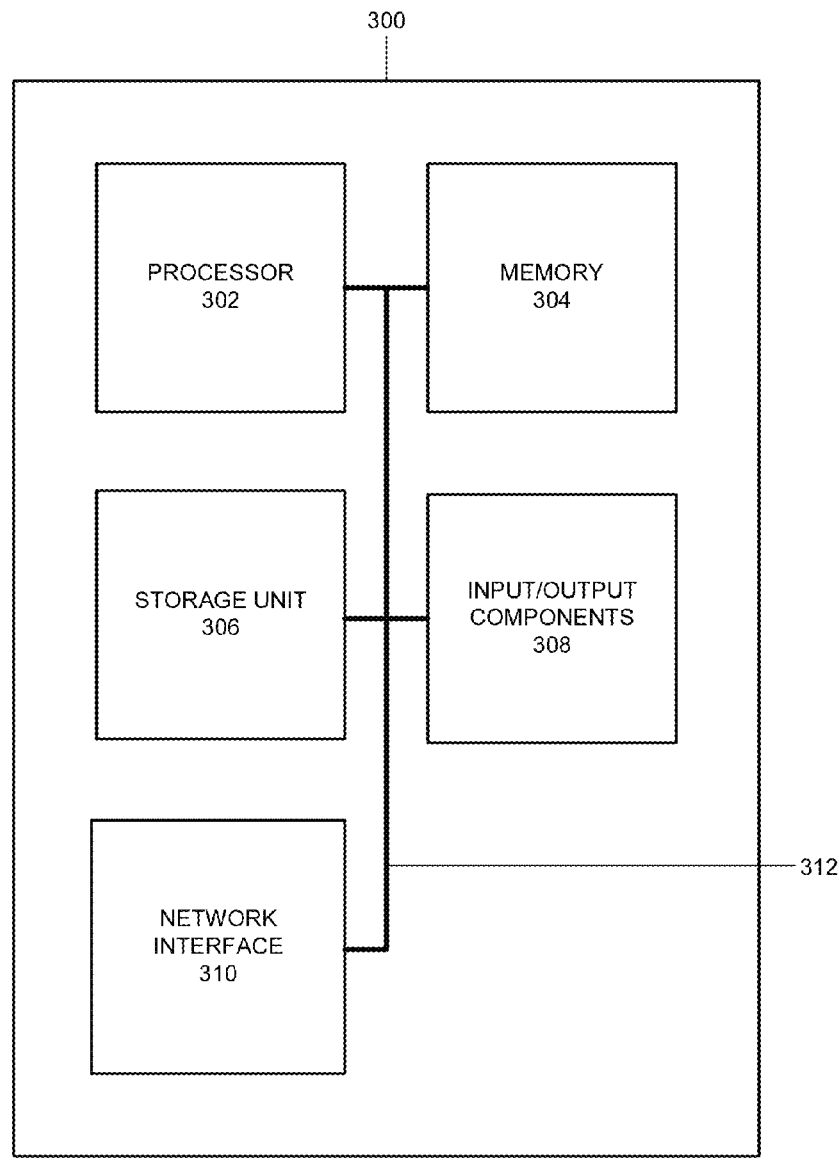
FIG. 3 is a block diagram of an exemplary network device of FIG. 1.

FIG. 3 is a block diagram of an exemplary network device 300, which may correspond to, for example, mobile device 102, content presentation device 104, content identifier device 108, it content storage device 110. As shown, network device 300 may include a processor 302, a memory 304, a storage unit 306, input/output components 306, a network interface 308, and a communication path 310. In different implementations, network device 300 may include additional, fewer, different, or different arrangement of components than the ones illustrated in FIG. 3. For example, network device 300 may include line interfaces, such as interfaces for receiving and forwarding data.

Processor 302 may include a processor, a microprocessor, an Application Specific Integrated Circuit (ASIC), a Field Programmable Gate Array (FPGA), and/or other processing logic capable of controlling network device 300. Memory 304 may include static memory, such as read only memory (ROM), and/or dynamic memory, such as random access memory (RAM), or onboard cache, for storing data and machine-readable instructions (e.g., programs, scripts, etc.). Storage unit 306 may include a floppy disk, CD ROM, CD read/write (R/W) disc, and/or flash memory, as well as other types of storage devices for storing data and/or machine-readable instructions (e.g., a program, script, etc.).

Input/output components 308 may include a display screen, a keyboard, a mouse, a speaker, a microphone (e.g., microphone 210), a camera (e.g., camera 212), a DVD reader, Universal Serial Bus (USB) lines, and/or other types of components for converting physical events or phenomena to and/or from signals that pertain to network device 300.

Network interface 310 may include a transceiver (e.g., a transmitter or receiver) for network device 300 to communicate with other devices and/or systems. For example, via network interface 310, network device 300 communicating over a network, such as the Internet, an intranet, a terrestrial wireless network (e.g., a WLAN, WiFi, WiMax, etc.), a satellite-based network, etc. Network interface 308 may include a modem, an Ethernet interface to a LAN, and/or an interface/connection for connecting network device 300 to other devices (e.g., a Bluetooth interface).

Communication path 312 may provide an interface through which components of network device 300 can communicate with one another.

Figure 4:
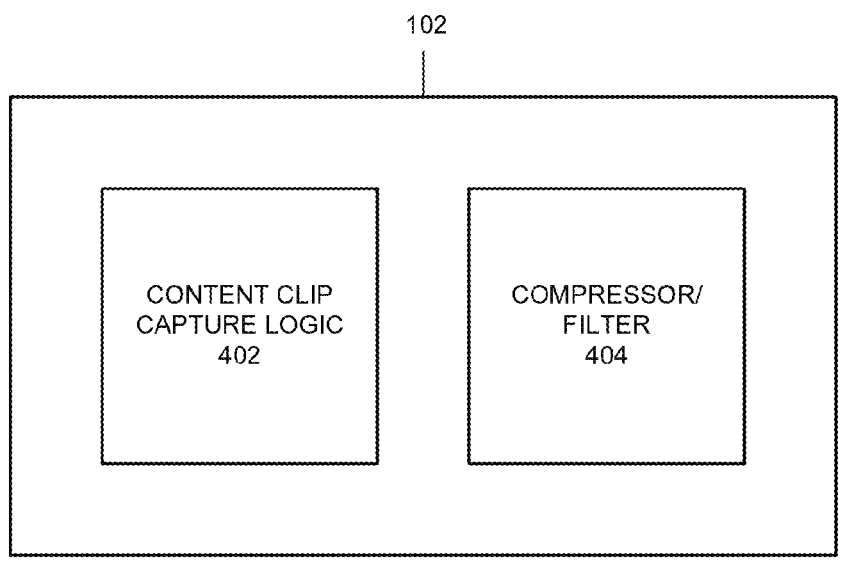
FIG. 4 is a functional block diagram of the mobile device of FIG. 1.

FIG. 4 is a functional block diagram of mobile device 102. As shown, mobile device 102 may include content clip capture logic 402 and a compressor/filter 404. Depending on the implementation, mobile device 102 may include additional components, such as components illustrated in network device 300, an operating system, an application, etc. Furthermore, in some implementations, functionalities of content clip capture logic 402 and compression/filter 404 may be organized as or integrated into a single component or an application, or alternatively, distributed over additional components.

Content clip capture logic 402 may capture a clip of a video/audio that is playing on another device. In some implementations, Content clip capture logic 402 may also obtain a video/audio clip from a communication application (e.g., a browser, an email message, etc.). Upon capturing/obtaining the video/audio clip, content clip capture logic 402 may generate a fingerprint of the clip. A fingerprint may include, for example, filtered/compressed data and a time stamp (e.g., the time of capture) for the video clip (e.g., a time stamp for the first frame of the video clip). The time stamp may include the time, time zone, etc.

In some implementations, content clip capture logic 402 may also include components for receiving, from content identifier device 108, notifications that list the identities (e.g., titles of movies) of original contents whose fingerprints match the fingerprint of the captured clip. In addition, content clip capture logic 402 may include graphical user interface (GUI) components via which the user may configure and/or operate content clip capture logic 402.

Compressor/filter 404 may filter/compress a video/audio clip for another component, such as content clip capture logic 402. The filtering and/or compression is further described below with reference to FIGS. 5A and 5B.

Figure 5A:
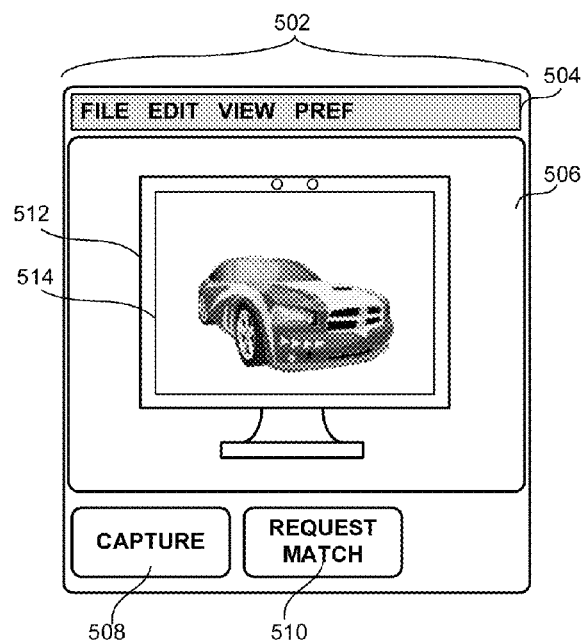
FIG. 5A illustrates an exemplary graphical user interface (GUI) window of the content clip capture logic of FIG. 4.

FIG. 5A illustrates an exemplary GUI window 502 of content clip capture logic 402. GUI window 502 may be displayed on display 204 (FIG. 2) of mobile device 102. As shown, GUI window 502 may include a menu bar 504, viewing pane 506, capture button 508, and request match button 510. Depending on the implementation, GUI window 502 may include additional, fewer, different, or different arrangement of components than those illustrated in FIG. 5A. For example, in place of menu bar 504, GUI window 502 may provide buttons for selecting different functionalities of content clip capture logic 402.

Menu bar 504 may provide options to allow the user to capture/delete the clip, set parameters for capturing the clip (e.g., how many frames of video to capture, length of a captured audio clip, whether to apply a specific filter, etc.), etc. Viewing pane 506 may show the video clip that is being captured or already captured. In FIG. 5A, viewing pane 506 shows a content player 512 (e.g., digital television) that is playing a piece of content on its display 514.

Capture button 508 may cause mobile device 102 to capture images/sound that are shown/played on viewing pane 504 or a speaker (e.g., speaker 202) as a video/audio clip. Request match button 510 may cause a fingerprint of a captured clip to be generated and sent along with a request to identify contents with matching fingerprints (i.e., the original contents that include video/audio similar to the captured video/audio clip), to content identifier device 108. In one implementation, when content identifier device 108 responds with a list of original programs (e.g., movie, television program, song, etc.) whose fingerprints match the fingerprint sent from mobile device 102, GUI window 502 may show the list, along with other GUI components for interacting with the list (e.g., purchasing the original contents, requesting the original contents to be downloaded to another device (e.g., a set-top box) or mobile device 102, etc.).

As illustrated in FIG. 5A, display 514 that is showing content may occupy only part of viewing pane 506. In such instances, each frame of the captured video clip may include areas that are unrelated to the sampled content. As part of compression/filtering, therefore, compressor/filter 404 may crop out such areas from each frame of the captured video clip. In one implementation, the cropping may entail image recognition (border recognition) to identify and isolate display 514. Alternatively, GUI window 502 may provide a tool for the user to designate or identify an area, within viewing pane 506, that display 514 occupies.

Figure 5B:
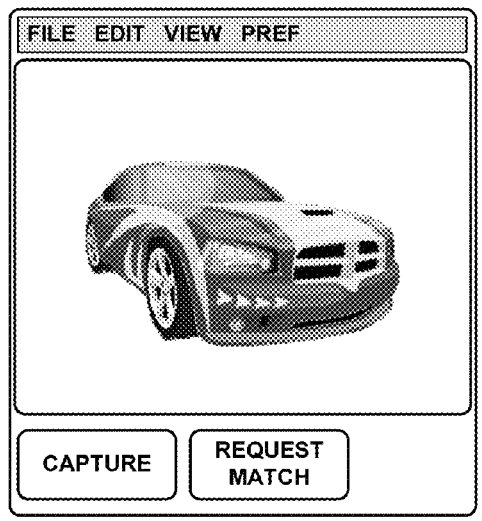
FIG. 5B illustrates the GUI window of FIG. 5A when the video camera of the mobile device of FIG. 1 zooms in on a display area of FIG. 5A.

In other implementations, the user may be expected to adjust the zoom of mobile device 102 such that display 514 fully spans viewing pane 506. FIG. 5B illustrates the GUI window of FIG. 5A when the video camera of mobile device 102 zooms in on display 514.

Content clip capture logic 402 may further process the video clip by compressing or filtering each of the frames spatially and/or temporally. For example, in some implementations, the compression/filtering may include placing the captured video in a compressed lossy format, such as a Joint Photographic Experts Group (JPEG/JPG) format. For example, a High Definition (HD) video frame may be compressed (i.e., sampled) to 100×100 pixels. In this embodiment, it may be easier to compare the compressed video samples to compressed video contents for identification, than to compare uncompressed video samples to uncompressed video contents. In another example, color images of the frames of the captured video may be converted into grayscale images/frames.

In some implementations, via menu bar 504, a user may set parameters for controlling the compression/filtering. For example, the parameters may include the number of frames to include in a temporal filtering window, the size of a window to use for two-dimensional filtering, parameters that are associated with interpolation or decimation (e.g., digital signal processing parameters), etc.

Content clip capture logic 402 may tag the processed video clip with a time stamp and/or the frame rate to generate the fingerprint.

In some embodiments, content clip capture logic 402 may include a number of optimizations. For example, when capture button 508 is pressed, content clip capture logic 402 may not actually capture a video/audio clip, but generate, on the fly, the fingerprint of the clip that otherwise would have been captured. In such instances, each frame of the "would-have-been-captured" video clip may be momentarily stored in memory 304 of mobile device 102 during the computation required to generate the fingerprint. Each frame may be removed from memory 304 when it is no longer needed, and as more incoming frames are cached in memory 304. At the end of the processing, content clip capture logic 402 may have the fingerprint of the "would-have-been-captured" video clip.

In another example, content clip capture logic 402 may stream a video/audio clip to content identifier device 108 for further processing. This may be desirable when processing capabilities of content identifier device 108 are sufficient to handle multiple client video/audio streams.

In yet another example, content clip capture logic 402 may perform voice or speech recognition. The recognized text/voice may be used by content identifier device 108 to narrow its field of search for contents whose fingerprints match the fingerprint received from mobile device 102.

Figure 6:
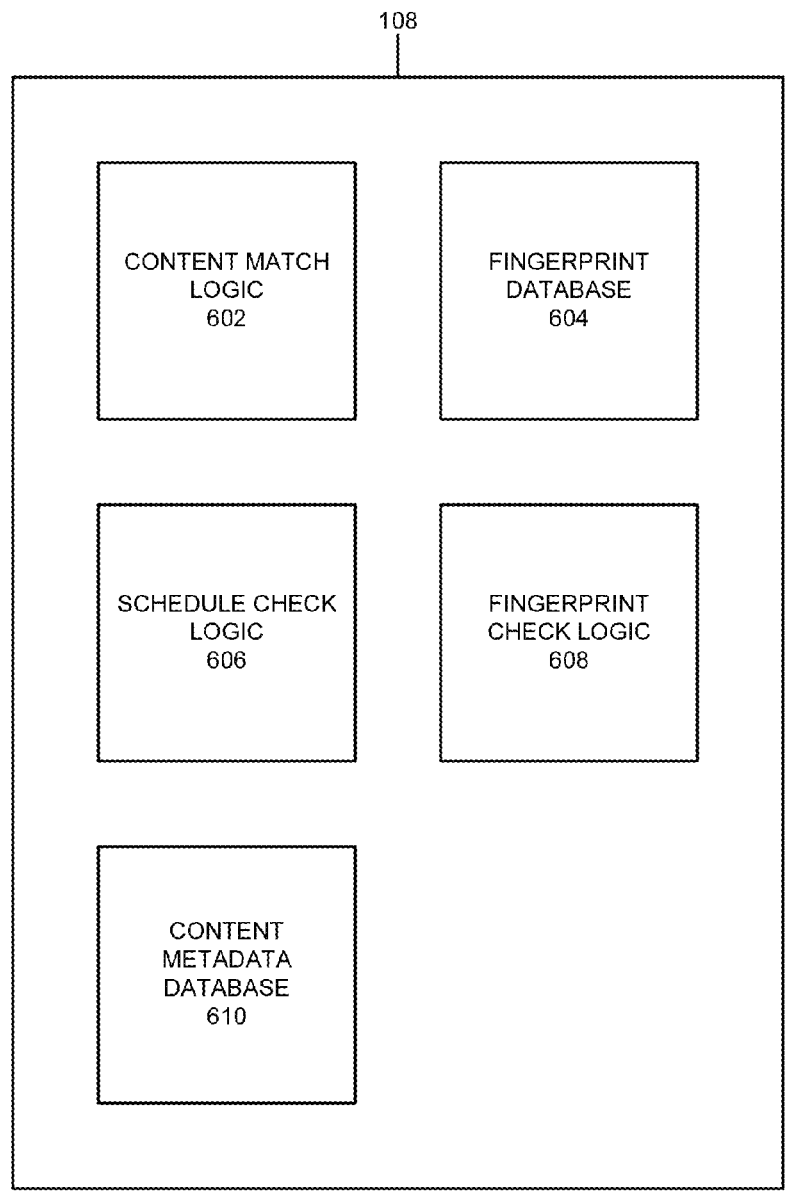
FIG. 6 is a functional block diagram of an exemplary content identifier device of FIG. 1.

FIG. 6 is a functional block diagram of content identifier device 108. As shown, content identifier device 108 may include content match logic 602, a fingerprint database 604, schedule check logic 606, and fingerprint check logic 608.

Content match logic 602 may receive a fingerprint and/or other data (e.g., user preferences) from mobile device 102. Furthermore, using the fingerprint, content match logic 602 may obtain a list of programs or contents with a matching fingerprint.

In obtaining the list of programs/contents, content match logic 602 may initially query schedule check logic 606 to narrow its search space of contents. Upon receiving the query, schedule check logic 606 may identify a set of contents whose scheduled playing times match the time stamp of the fingerprint received at content match logic 602. Schedule check logic 606 may obtain the scheduled playing times from a schedule database on content storage device 110 (see FIG. 7, described below). If the received fingerprint was generated based on a clip of an on-demand content, schedule check logic 606 may be unable to narrow the search space based on the scheduling information.

In one embodiment, for each frame of the received fingerprint, content match logic 602 may query fingerprint check logic 608 to select, from each content of the narrowed search space, one or more frames that would have appeared on display 514 of content player 512 approximately at the moment the fingerprint was generated. Furthermore, for each of the selected frames, fingerprint check logic 608 may determine whether the selected frame matches the corresponding frames of the received fingerprint (i.e., compressed/filtered video clip).

Depending on the implementation, the matching may be based on different image comparison algorithms (e.g., thresholding an absolute value of Fourier, Hough, Mobius, or other transforms of the images, etc.). Content match logic 602 may determine that a fingerprint received from mobile device 102 "matches" that of content when a certain number of frames of the captured video match the corresponding frames of the content based on a comparison algorithm.

In comparing the frames, fingerprint check logic 608 may consult fingerprint database 604 that includes partially or fully pre-computed fingerprints (e.g., Fourier transforms of the frames) of different contents. Fingerprint database 604 may include, for each of frame of content, a compressed, transformed or filtered frame. Fingerprint database 604 may be updated periodically or at different times with fingerprints of new contents.

When content match logic 602 identifies a list of contents whose fingerprints match the fingerprint received from mobile device 102, content match logic 602 may look up metadata of the identified contents. Once the metadata is obtained, content match logic may perform, for example, send the list of identified contents along with their metadata to mobile device 102; cause an identified content to be downloaded to a designated destination device (e.g., a set-top box); send the metadata and the identifications to a network address associated with the user; etc. The metadata may include, for example, the URL of a web site at which a piece of identified content can be purchased or downloaded, a physical address of a store from a copy of the content may be purchased, etc.

Depending on the implementation, content identifier device 108 may include additional, fewer, or different components than those illustrated in FIG. 6. For example, in some implementations, a computational burden that is associated with processing video clips may be placed on content identifier device 108 rather than mobile device 102. In such implementations, content identifier device 108 may include components for compressing/filtering a video clip that is captured at mobile device 102. Correspondingly, content clip capture logic 402 of mobile device 102 may capture and send a captured video clip to content identifier device 108, with little processing (e.g., reducing the resolution of the frames of the captured video clip).

In another example, fingerprint database 604 may not be stored at content identifier 108, but at content storage device 110. This may simplify administrative processes for maintenance of fingerprint database 604. Alternatively, content identifier device 108 may include a local copy of schedules for content/programs. This may allow schedule check logic 606 to quickly access the scheduling information for narrowing search space to contents with time stamps matching that of the received fingerprint.

Figure 7:
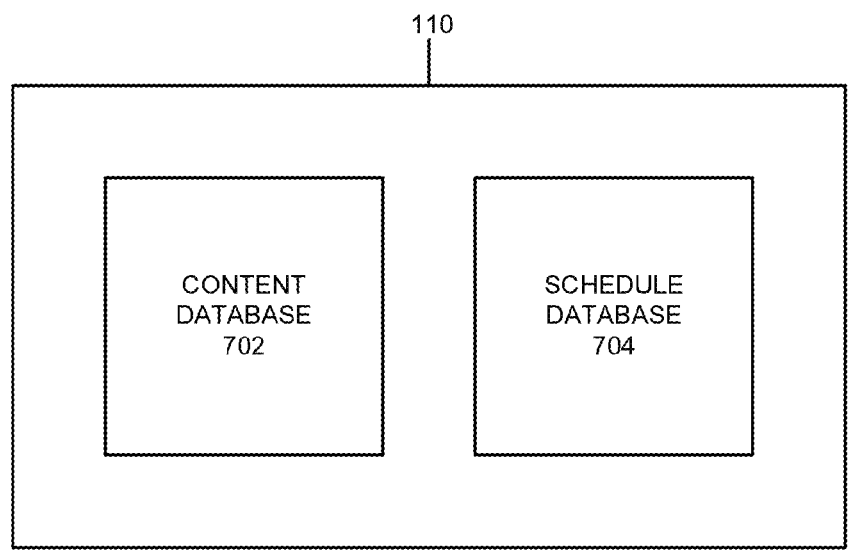
FIG. 7 is a functional block diagram of an exemplary content storage device of FIG. 1.

FIG. 7 is a functional block diagram of content storage device 110 of FIG. 1. As shown, content storage device 110 may include a content database 702 and schedule database 704. Depending on the implementation, content database 702 may include additional, fewer, or different components than those illustrated in FIG. 7 (e.g., an operating system, firewall application, etc.).

Content database 702 may provide content to content identifier device 108, for example, for determining fingerprints of content and updating fingerprint database 604.

Schedule database 704 may include schedules associated with contents (e.g., broadcast times). Content storage device 110 may look up the database upon receiving a request for one or more schedules from content identifier device 108. Contents whose schedules are in schedule database 704 may or may not be stored in content database 702.

Figure 8:
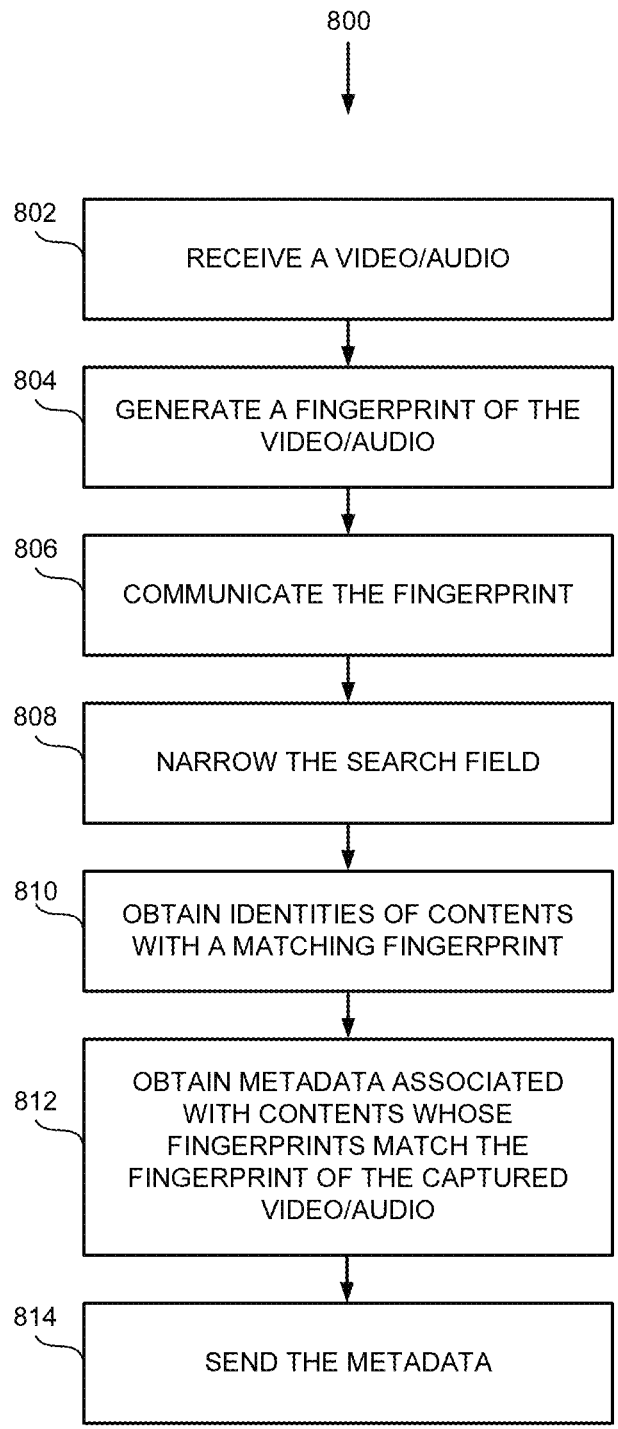
FIG. 8 is a flow diagram of an exemplary process that is associated with content fingerprinting.

FIG. 8 is a flow diagram of an exemplary process 800 that is associated with fingerprinting. Process 800 may start with mobile device 102 receiving a video/audio of another device playing content (block 802).

Mobile device 102 may generate a fingerprint of the video/audio (block 804). To generate the fingerprint, mobile device 102 may compress or filter the video/audio. In addition, mobile device 102 may time stamp the compressed/filtered video/audio and/or each frame of the compressed/filtered video. As indicated above, a time stamp may not only indicate the time when the video clip was captured, but also the time zone.

Mobile device 102 may communicate the fingerprint to content identifier device 108 (block 806). For example, when a user activates request match button 510 in FIG. 5A, mobile device 102 may send, to content identifier device 108, a message requesting content whose fingerprint matches the generated fingerprint.

Upon receiving the message, content identifier device 108 may narrow the field of search for identifying content with a matching fingerprint (block 808). As described above, content identifier device 108 may obtain a list of contents that were playing (e.g., being broadcast) at the time the video was being captured at mobile device 102, based on program schedules and the time stamp of the received fingerprint.

Content identifier device 108 may retrieve the identities of contents with the matching fingerprint (block 810). For example, content identifier device 108 may retrieve the identities by searching the list of contents obtained at block 808.

Upon obtaining the identities of the contents, content identifier device 108 may retrieve metadata associated with the contents (e.g., universal resource locator (URL) universal resource identifier (URI), physical location, etc.) from content metadata database 610.

Content identifier device 108 may send the metadata to mobile device 102 (lock 814). For example, content identifier device 108 may send, to a user of mobile device 102, an email message that includes network addresses (e.g., URLs) of the sites from which the contents may be downloaded. In another implementation, content identifier device 108 may cause the identified content from content storage device 110 to be sent to a device designated by mobile device 102.

In response to the received location information, the user at mobile device 102 may purchase the content, bookmark a URL corresponding to the content, etc.

Figure 9:
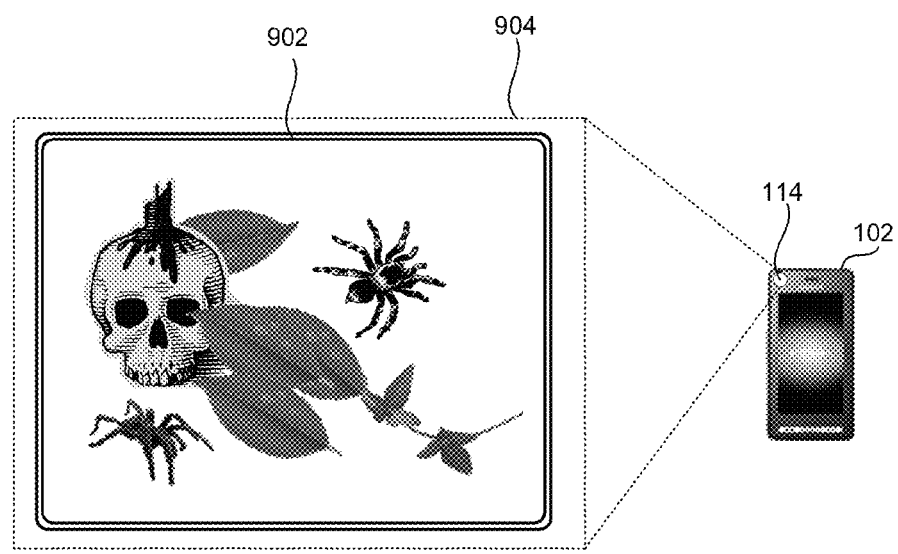
FIG. 9 illustrates an example that is associated with content fingerprinting.

FIG. 9 illustrates an example that is associated with fingerprinting. Assume that Don is using mobile device 102. While Don is visiting his friend Jessica, Don sees a movie playing on Jessica's television. Although Don does not remember the title of the movie, Don is entertained by the movie. Don decides to purchase the movie, and accordingly, Don captures a video clip of the movie using mobile device 102.

Mobile device 102 generates a fingerprint based on the clip and sends the fingerprint to content identifier device 108. Content identifier device 108 determines that the video clip is from the movie "Killer Spiders" based on the fingerprint, and offers Don an opportunity to purchase the movie via a GUI interface on mobile device 102. Don orders the movie, and causes the movie to be downloaded to his set-top box at home.

In the above example, mobile device 102 may be used to identify a video. A user may direct a smart phone's camera to a video that is playing on a device and capture a clip (e.g., few frames) of the video. Based on the clip, the mobile device may generate and transmit a fingerprint to a remote, network device. The network device may identify the original video with a matching fingerprint, and notify the user. The user may view, purchase or bookmark the original video, etc.

The foregoing description of implementations provides illustration, but is not intended to be exhaustive or to limit the implementations to the precise form disclosed. Modifications and variations are possible in light of the above teachings or may be acquired from practice of the teachings.

For example, in the above description, content match logic 602 may narrow its search space of contents based on the time stamp of a fingerprint received from mobile device 102 and scheduled playing times of contents. However, in cases where the received fingerprint has been generated from a clip of on-demand video, content match logic 602 may be unable to narrow its search space based on the scheduling information.

To handle such cases, fingerprints in fingerprint database 604 may include, for each of contents, a set of hashes that are generated from the frames of the content, in addition to compressed/filtered content. Each of the hashes may correspond to a predetermined number of frames (i.e., number equal to the number of frames that are captured at mobile device 102) from which the hash is generated.

In such an implementation, when mobile device 102 captures a clip, mobile device 102 may generate a fingerprint that includes compressed frames/images and a hash of the compressed frames/images. When content match logic 602 receives such a fingerprint from mobile device 102, content match logic 602 may narrow its search space by comparing the hash of the received fingerprint to the hashes in fingerprint database 604. The narrowed search space of contents may include a set of contents with hashes that match the hash of the fingerprint.

In another example, while series of blocks have been described with regard to an exemplary process illustrated in FIG. 8, the order of the blocks may be modified in other implementations. In addition, non-dependent blocks may represent acts that can be performed in parallel to other blocks.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

Further, certain portions of the implementations have been described as "logic" that performs one or more functions. This logic may include hardware, such as a processor, a microprocessor, an application specific integrated circuit, or a field programmable gate array, software, or a combination of hardware and software.

No element, act, or instruction used in the present application should be construed as critical or essential to the implementations described herein unless explicitly described as such. Also, as used herein, the article "a" is intended to include one or more items. Further, the phrase "based on" is intended to mean "based, at least in part, on" unless explicitly stated otherwise.

What is claimed is:

1. A method comprising:
   obtaining a fingerprint associated with a video clip, wherein the video clip is generated by capturing, with a video camera associated with a mobile device, an image when the image is displayed on a display screen of a content presentation device;
   obtaining a schedule of contents;
   identifying a set of contents by narrowing search space of contents based on the fingerprint;
   determining whether a frame of the fingerprint matches a frame of one of the set of contents;
   obtaining an identity of the one of the set of contents in response to determining that the frame of the fingerprint matches the frame of the one of the set of contents; and
   sending, over a network, information including the identity of the one of the set of contents to the mobile device.

2. The method of claim 1, wherein the sending the information includes:
   obtaining a universal resource locator (URL) associated with the content; and
   sending the URL to the mobile device.

3. The method of claim 1, wherein the obtaining the fingerprint includes:
   receiving the video clip from the mobile device over the network; and
   generating the fingerprint from the received video clip.

4. The method of claim 1, wherein the obtaining the fingerprint includes:
   receiving the fingerprint from the mobile device over the network.

5. The method of claim 1, wherein identifying the set of content includes comparing a time stamp of the fingerprint to scheduled playing times of the contents.

6. The method of claim 1, wherein the generating the fingerprint includes:
   converting color images of frames of the video clip into gray scale images.

7. The method of claim 1, wherein the contents includes:
   television programs;
   movies; or
   songs.

8. The method of claim 1, wherein the determining includes:
   comparing an image in the frame of the fingerprint to an image in the frame of the one of the set of contents.

9. The method of claim 1, wherein the frame of the fingerprint is associated with a time stamp that is approximately equivalent to a time when the frame of the one of the set of contents was displayed at a content presentation device.

10. A system comprising:
    a network device, comprising:
       a receiver to receive a first fingerprint associated with a video clip from a mobile device over a network wherein the video clip is generated by capturing, with a video camera of a mobile device, an image when the image is displayed on a display screen of a content presentation device, and the first fingerprint includes information regarding a time of capturing the video clip at the mobile device;
       a processor configured to:
          narrow search space for contents based on a portion of the first fingerprint;
          identify, within the narrowed search space, content with a fingerprint matching the portion of the first fingerprint;
          determine whether a frame of the content matches a frame of the first fingerprint; and
          obtain an identity of the content in response to determining that the frame of the content matches the frame of the first fingerprint; and
       a transmitter to send, over the network, information including the identity of the content to a network address associated with a user of the mobile device.

11. The system of claim 10, further comprising the mobile device, wherein the mobile device includes:
    a processor configured to receive, from the video camera, the captured video clip that is shown on the display screen of the content presentation device, and to generate the first fingerprint based on the captured video clip;
    a transmitter configured to send the first fingerprint to the network device; and
    a receiver configured to receive, from the network device, the information including the identity of the content.

* * * * *